United States Patent
Wennersten et al.

(10) Patent No.: US 12,355,957 B2
(45) Date of Patent: Jul. 8, 2025

(54) TEMPORAL FILTER

(71) Applicant: Telefonaktiebolaget LM Ericsson (publ), Stockholm (SE)

(72) Inventors: Per Wennersten, Årsta (SE); Christopher Hollmann, Uppsala (SE); Jacob Ström, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/269,873

(22) PCT Filed: Dec. 10, 2021

(86) PCT No.: PCT/SE2021/051232
§ 371 (c)(1),
(2) Date: Jun. 27, 2023

(87) PCT Pub. No.: WO2022/146215
PCT Pub. Date: Jul. 7, 2022

(65) Prior Publication Data
US 2024/0314307 A1     Sep. 19, 2024

Related U.S. Application Data

(60) Provisional application No. 63/131,060, filed on Dec. 28, 2020.

(51) Int. Cl.
*H04N 19/117* (2014.01)
*H04N 19/105* (2014.01)
(Continued)

(52) U.S. Cl.
CPC ......... *H04N 19/117* (2014.11); *H04N 19/105* (2014.11); *H04N 19/172* (2014.11); *H04N 19/80* (2014.11)

(58) Field of Classification Search
None
See application file for complete search history.

(56) References Cited

U.S. PATENT DOCUMENTS 6,281,942 B1  8/2001  Wang
10,469,749 B1  11/2019  Linzer
(Continued)

FOREIGN PATENT DOCUMENTS

WO     2020/185152 A1     9/2020

OTHER PUBLICATIONS

International Search Report and Written Opinion dated Feb. 17, 2022 issued in International Patent Application No. PCT/SE2021/051232 (12 pages).
(Continued)

*Primary Examiner* — Xiaolan Xu
(74) *Attorney, Agent, or Firm* — Rothwell, Figg, Ernst & Manbeck, P.C.

(57) ABSTRACT

There is provided a method, performed by a temporal filter. The method comprises obtaining a current picture and a set of one or more neighbor pictures comprising a first neighbor picture, wherein each of the one or more neighbor pictures either precedes or follows the current picture in a picture count order. The method comprises, based on a first block of pixel values of the current picture and a first block of pixel values in the first neighbor picture, determining a first filter weight, W1, for at least a first pixel value in the first block of pixel values of the current picture, wherein the first block of pixel values in the first neighbor picture correspond to the first block of pixel values in the current picture. The method comprises, calculating a first filtered pixel value, Pf1, at least using as inputs to the calculation: W1, P1, and Pr1, where PI is the first pixel value from the first block of pixel values of
(Continued)

the current picture, and Pr1 is a pixel value from the first neighbor picture that corresponds to the first pixel value.

20 Claims, 7 Drawing Sheets

(51) Int. Cl.
*H04N 19/172* (2014.01)
*H04N 19/80* (2014.01)

(56) References Cited

U.S. PATENT DOCUMENTS

| | | |
|---|---|---|
| 2003/0161407 A1 | 8/2003 | Murdock et al. |
| 2005/0094003 A1 | 5/2005 | Thorell |
| 2008/0101469 A1 | 5/2008 | Ishtiaq et al. |
| 2008/0159391 A1 | 7/2008 | He et al. |
| 2008/0204600 A1 | 8/2008 | Xu et al. |
| 2011/0085084 A1 | 4/2011 | Jain et al. |
| 2013/0271664 A1 | 10/2013 | Mathew et al. |
| 2018/0343448 A1 | 11/2018 | Possos et al. |
| 2019/0020894 A1 | 1/2019 | Peng et al. |

OTHER PUBLICATIONS

International Preliminary Report on Patentability dated Jul. 4, 2023 issued in International Patent Application No. PCT/SE2021/051232 (8 pages).

Wennersten, P. et al., "AHG10: Encoder-only GOP-based temporal filter", Document: JVET-O0549-v2, Joint Video Experts Team (JVET) of ITU-T SG 16 WP 3 and ISO/IEC JTC 1/SC 29/WG 11, 15th Meeting: Gothenburg, SE, Jul. 3-12, 2019 (5 pages).

Enhorn, J. et al., "A Temporal Pre-Filter for Video Coding Based on Bilateral Filtering", Oct. 25, 2020, 2020 IEEE International Conference on Image Processing (ICIP), XP033869213 (5 pages).

Wennersten, P. et al., "AHG10: Encoder-only GOP-based temporal filter", Document: JVET-O0549-v2, Joint Video Experts Team (JVET) of ITU-T SG 16 WP 3 and ISO/IEC JTC 1/SC 29/WG 11, 15th Meeting: Gothenburg, SE, Jul. 3-12, 2019, XP030219874 (4 pages).

Wennersten, P. et al., "Encoder-only GOP-based temporal filter", Document: JCTVC-A10023-v2, Joint Collaborative Team on Video Coding (JCT-VC) of ITU-T SG 16 WP 3 and 1S0/IEC JTC 1/SC 29/WG 11, 35th Meeting: Geneva, CH, Mar. 22-27, 2019, XP030200764 (6 pages).

Enhorn, J. et al., "Improvements to a temporal filter for video coding", May 27, 2022, 2022 IEEE International Symposium on Circuits and Systems (ISCAS), XP034224393 (5 pages).

Chen, J. et al., "Algorithm description for Versatile Video Coding and Test Model 11 (VTM 11)", Document: JVET-T2002-v1, Joint Video Experts Team (JVET) of ITU-T SG 16 WP 3 and ISO/IEC JTC 1/SC 29, 20th Meeting, by teleconference, Oct. 7-16, 2020 (102 pages).

FIG. 7

TEMPORAL FILTER

CROSS REFERENCE TO RELATED APPLICATIONS

This application is a 35 U.S.C. § 371 National Stage of International Patent Application No. PCT/SE2021/051232, filed on 2021 Dec. 10, which claims priority to U.S. provisional patent application No. 63/131,060, filed on 2020 Dec. 28, which is incorporated by this reference.

TECHNICAL FIELD

This disclosure relates to video filtering using a temporal filter.

BACKGROUND

1. Video Compression

A source video sequence consists of a series of pictures (a.k.a., images or frames) where each picture consists of one or more components. Each component can be described as a two-dimensional rectangular array of sample values (a.k.a., pixel values or pixels for short). It is common that a picture in an encoded video sequence consists of three components: one luma component (Y) where the pixel values are luma values, and two chroma components (Cb and Cr), where the pixel values are chroma values. Components are sometimes referred to as "color components."

Video is the dominant form of data traffic in today's networks and is projected to still increase its share. One way to reduce the data traffic per video is compression. Here the source video sequence is encoded to a bitstream comprising an encoded video sequence, which then can be stored and transmitted to end users. Using a decoder, the end user can extract the video data and display it on a screen. However, since the encoder may not know what kind of device the encoded bitstream is going to be sent to, the encoder typically compresses the source video according to a standardized compression scheme and format. Then all devices which support the chosen standard can decode the video.

2. Commonly Used Video Coding Standards

Video standards are usually developed by international organizations as these represent different companies and research institutes with different areas of expertise and interests. The currently most applied video compression standard is H.264/AVC which was jointly developed by ITU-T and ISO. The first version of H.264/AVC was finalized in 2003, with several updates in the following years. The successor of H.264/AVC, which was also developed by ITU-T and ISO, is known as H.265/HEVC and was finalized in 2013. Currently, the successor of HEVC is being developed. This new codec is called Versatile Video Coding (VVC).

3. Structure of a Coded Video Sequence

A coded video sequence typically starts with an independently coded picture. This independently coded picture is termed an "I-frame." After the I-frame, the coded video sequence typically comprises several pictures which predict from (i.e., depend on) at least one other picture. These dependent pictures are herein called "B-frames." Typically, the coding of pictures is done hierarchically. First picture 0 is coded, then picture 16 which predicts picture 0, then picture 8 which predicts from 0 and 16, and so on. This is known as a Group-of-Pictures (GOP) structure.

Figure 7:
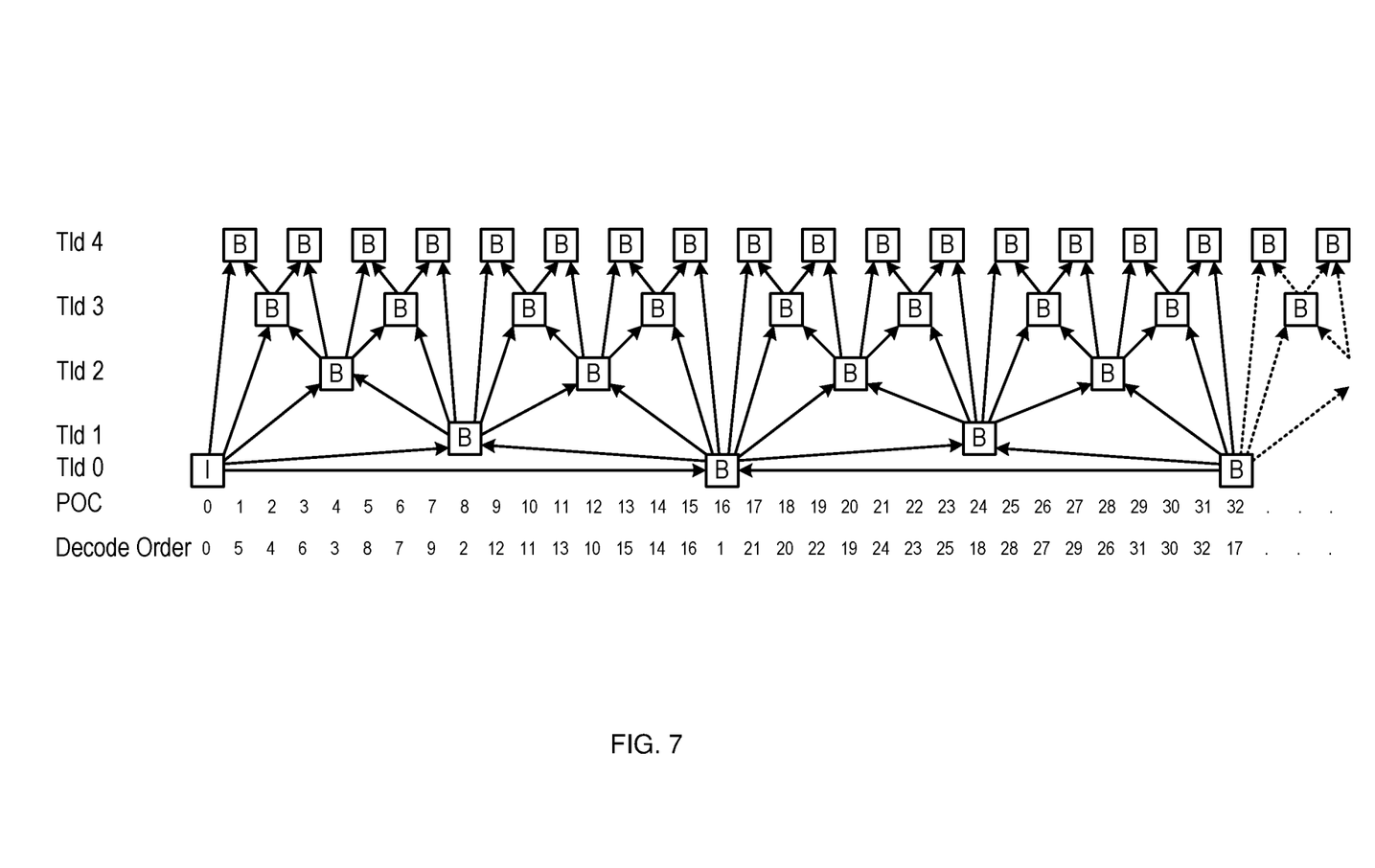
FIG. 7 illustrates an example GOP.

A GOP structure defines how pictures reference each other and the per picture specific configuration. The GOP can be divided into temporal sub layers as shown in FIG. 7. In the example, there are 5 temporal sub layers, with the temporal IDs (TId) 0-4. Pictures at a certain temporal sub layer may not neighbor pictures at a higher temporal sub layer. FIG. 7 illustrates a typical GOP structure for random access in High-Efficiency Video Coding (HEVC). Each GOP has 16 pictures starting with a picture at TId 0. The order in which the decoded pictures are displayed is determined by the picture order count (POC) number, which is typically different from the order in which the pictures are decoded (Decode Order). The arrows illustrate the references so, e.g., POC 8 is used as reference for POC 4, 6, 7, 9, 10 and 12. The decode order, i.e., the order that the pictures are processed by the decoder, is typically optimized so that referenced pictures are coming as close as possible to a picture to minimize latency and memory usage.

4. Temporal Denoising

A common strategy when trying to reduce noise in a video sequence is to find areas in different pictures that correspond to each other. This may be accomplished by a process known as motion estimation. A filter can then be applied, replacing the pixel values with a sum of weighted pixel values from the corresponding area in different pictures, thus smoothing out the noise. However, only pixels that truly correspond to each other should be filtered. If the difference between values is too large, the filtering strength should be decreased, or entirely zeroed out. This can for example be accomplished by a bilateral filter.

5. Existing Solutions

The current reference software VTM-11 for the most recent video compression standard by ITU-T and ISO/IEC contains a GOP-based motion compensated temporal filter. A description of the filter can be found in reference [1].

SUMMARY

Certain challenges presently exist. For instance, in the existing solution the filter weights depend only on the given pixels. Accordingly, this disclosure describes an improved method to determine the weights for each pixel. In the embodiments disclosed, the weights are determined based on an error components and/or a frequency component of the surrounding block. This makes the filter weights more flexible, and ultimately improves compression performance.

Accordingly, in one aspect there is provided a method for producing filtered picture values. The method may be performed by a temporal filter. The method includes obtaining a current picture and a set of one or more neighbor pictures, wherein each of the one or more neighbor pictures either precedes the current picture or follows the current picture in a picture count order, the set of neighbor pictures comprising a first neighbor picture. The method also includes, based on a first block of pixel values of the current picture and a first block of pixel values in the first neighbor picture, determining a first filter weight, W1, for at least a first pixel value in the first block of pixel values of the current picture, wherein the first block of pixel values in the first neighbor picture correspond to the first block of pixel values in the current picture. The method further includes, calculating a first filtered pixel value, Pf1, at least using as inputs to the calculation: W1, P1, and Pr1, where P1 is the first pixel value from the first block of pixel values of the current picture, and Pr1 is a pixel value from the first neighbor picture that corresponds to the first pixel value.

In another aspect there is provided a computer program comprising instructions which when executed by processing circuitry of a temporal filter, causes the temporal filter to perform the methods disclosed herein. In another aspect there is provided a carrier containing the computer program, wherein the carrier is one of an electronic signal, an optical signal, a radio signal, and a computer readable storage medium.

In another aspect there is provided a temporal filter where the temporal filter is adapted to perform the method of any embodiments disclosed herein. In some embodiments, the temporal filter includes processing circuitry; and a memory containing instructions executable by the processing circuitry, whereby the temporal filter is operative to perform the filtering methods disclosed herein.

An advantage of the embodiments is that blocks can be filtered more efficiently, providing a better input to the compression algorithm. This allows the video to be compressed in a more efficient way in the sense that fewer bits will be needed by the encoder for a certain video quality, or that the same number of bits will result in a higher video quality. The techniques described improve compression efficiency by a total of around 1%, which means that the same video quality can be obtained using 1% fewer bits.

BRIEF DESCRIPTION OF THE DRAWINGS

The accompanying drawings, which are incorporated herein and form part of the specification, illustrate various embodiments.

DETAILED DESCRIPTION

Figure 1:
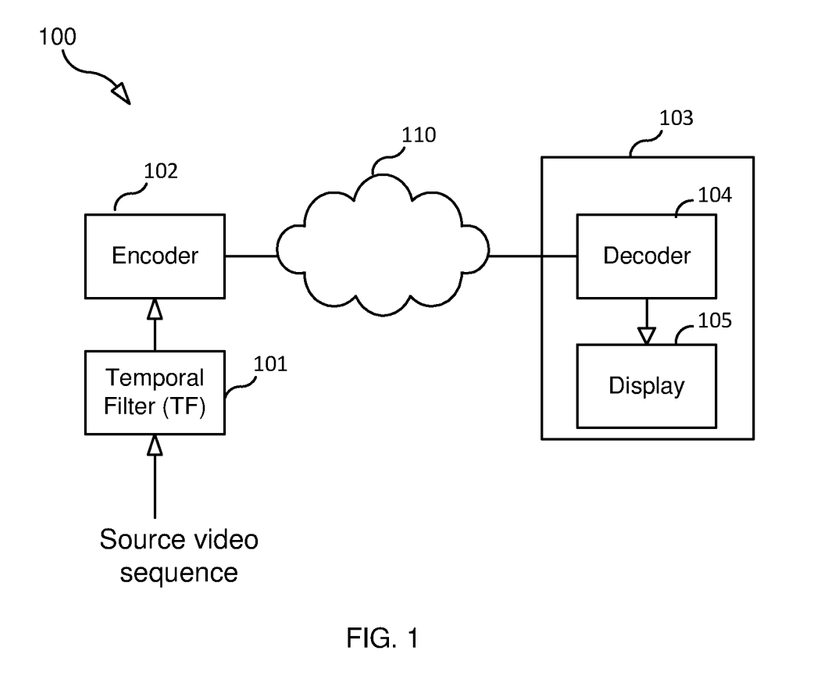
FIG. 1 illustrates a system according to an embodiment.

FIG. 1 illustrates a system 100 according to an embodiment. System 100 includes a temporal filter 101, a video encoder 102, a video decoder 104, wherein the encoder 102 is in communication with the decoder 104 via a network 110 (e.g., the Internet or other network). That is, encoder 102 encodes a temporally filtered video sequence produced by temporal filter 101 into a bitstream comprising an encoded video sequence and transmits the bitstream to decoder 106 via network 108. The decoder decodes the pictures included in the encoded video sequence to produce video data for display. Accordingly, decoder 104 may be part of a device 103 having a display device 105. The device 103 may be a mobile device, a set-top device, a head-mounted display, and the like. While temporal filter 101 is shown in FIG. 1 as being separate from encoder 102, in some embodiments (see, e.g., FIG. 2), temporal filter 101 is a component of encoder 102.

Figure 2:
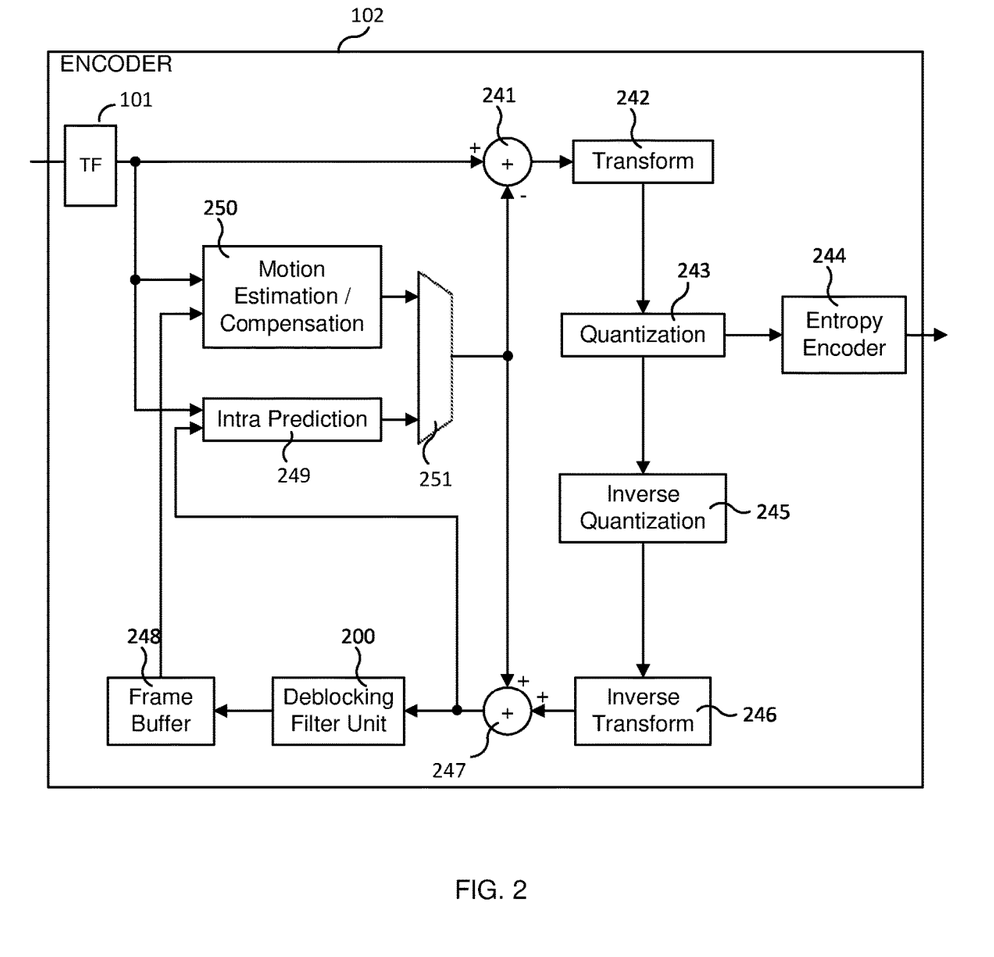
FIG. 2 is a schematic block diagram of a video encoder according to one embodiment.

FIG. 2 illustrates video encoder 102 according to an embodiment. In this embodiment video encoder 102 includes temporal filter 101, which in this example is a GOP-based temporal filter. Temporal filter 101 receives a source video sequence. The pictures of the source video sequence are read and then analyzed by temporal filter 101. Each picture is either filtered or untouched before further processing by encoder 102. In one embodiment, every 4th or 8th picture is filtered. Each picture output from the temporal filter 101 is passed to a motion estimation/compensation block 250 and an intra predictor 249. The outputs from the motion estimation/compensation block 250 and the intra predictor 249 are input to selector 251 that either selects intra prediction or inter prediction for the current block of pixels. The output from the selector 251 is input to an error calculator in the form of adder 241 that also receives the pixel values of the current block of pixels. Adder 241 calculates and outputs a residual error as the difference in pixel values between the block of pixels and its prediction. The error is transformed in transformer 242, such as by a discrete cosine transform, and quantized by quantizer 243 followed by coding in encoder 244, such as by entropy encoder. In inter coding, also the estimated motion vector is brought to encoder 244 to generate the coded representation of the current block of pixels. The transformed and quantized residual error for the current block of pixels is also provided to an inverse quantizer 245 and inverse transformer 246 to retrieve the original residual error. This error is added by adder 247 to the block prediction output from the motion compensator 250 or intra predictor 249 to create a reference block of pixels that can be used in the prediction and coding of a next block of pixels. This new reference block is first processed by a deblocking filter 200. The processed new reference block is then temporarily stored in frame buffer 248, where it is available to intra predictor 249 and motion estimator/compensator 250.

Temporal Filter 101

Figure 3:
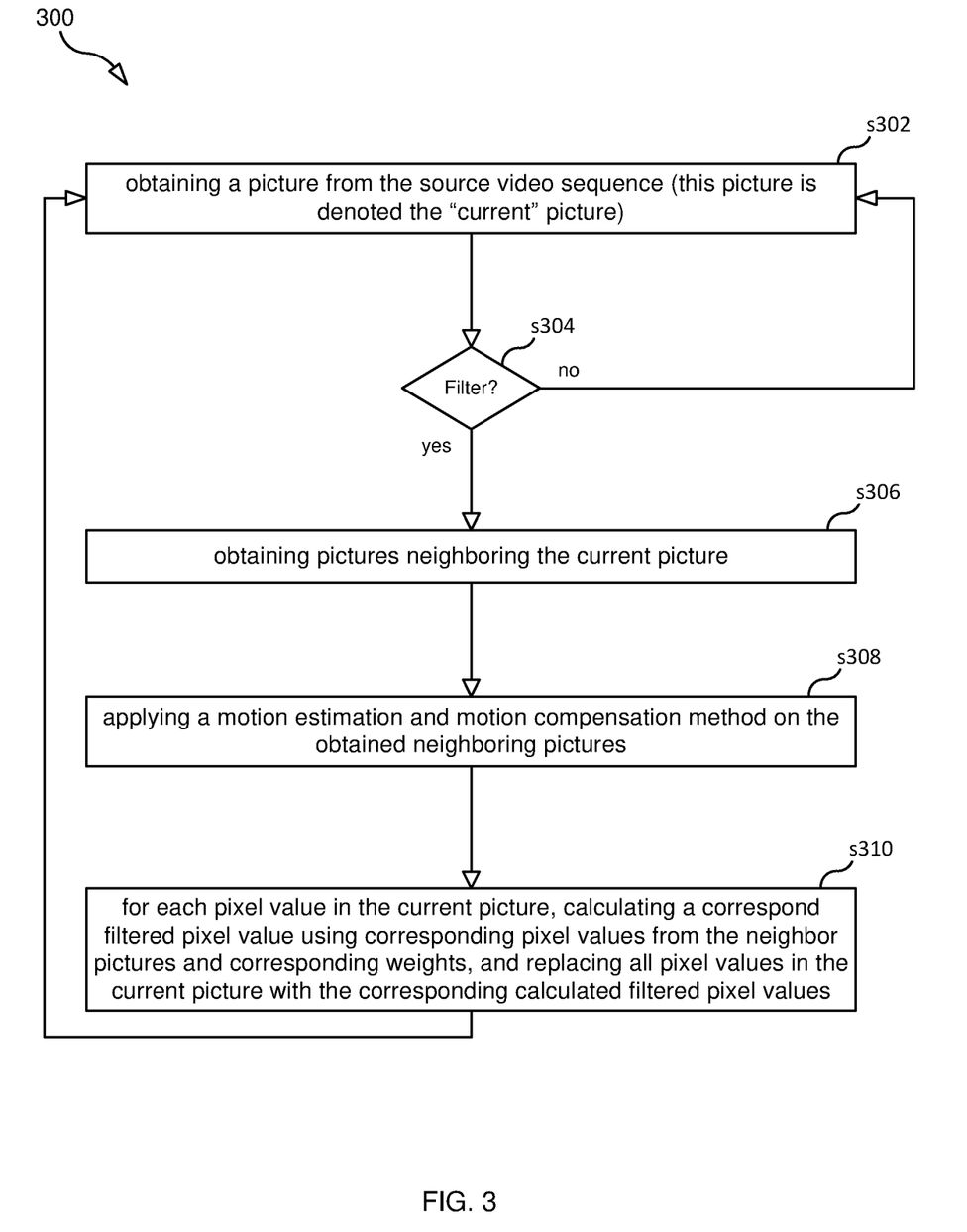
FIG. 3 is a flowchart illustrating a process according to an embodiment.

FIG. 3 is a flowchart illustrating a process 300 performed by temporal filter 101. Process 300 may begin in step s302.

Step s302 comprises obtaining a picture from the source video sequence (this picture is denoted the "current" picture).

Step s304 comprises determining whether or not to filter the current picture. In one embodiment, if the current picture is low enough in the coding hierarchy, it is filtered before encoding, otherwise it is not filtered. In one embodiment, random access (RA) pictures with POC mod 8==0 and low delay (LD) pictures with POC mod 4==0 are filtered, and full frame (AI) pictures are not filtered. If it is determined to filter the current picture, then process 300 proceeds to step s306, otherwise the process can go back to step s302 where the next picture in the sequence is obtained.

Step s306 comprises obtaining pictures neighboring the current picture. For example, for RA, two neighboring pictures before and after the current picture are obtained. For LD, two neighboring pictures before the current picture are obtained. In cases where e.g. the current picture is the first picture or close to be the last picture, only the available neighbor pictures are obtained.

Figure 4:
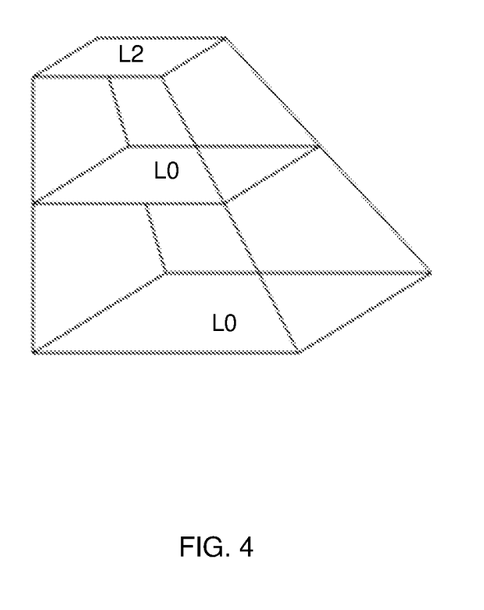
FIG. 4 illustrates a hierarchical motion estimation scheme.

Step s308 comprises applying a motion estimation and motion compensation method on the obtained neighboring pictures. This is done on, for example, 8×8 luma blocks. In one embodiment a hierarchical motion estimation scheme is used and the subsampling is illustrated in FIG. 4 where picture L0 is the current picture. Picture L1 is generated by averaging 2×2 blocks of the sample values in L0. Then picture L2 is generated by averaging 2×2 blocks of sample values in L1. Motion estimation is done by a first L2 full-pel motion vector search. The best motion vector is then scaled and used as a starting point for a full-pel search in L1. The best motion vector found then is again scaled and used as a starting point for a full-pel search in L0 that is followed by a final 16th sub-pel search. Motion compensation is then applied.

Step s310 comprises, for each pixel value in the current picture, calculating a correspond filtered pixel value using corresponding pixel values from the neighbor pictures and corresponding weights, and replacing all pixel values in the current picture with the corresponding calculated filtered pixel values. In one embodiment, the filtered pixel values ($I_n$) are calculated according to equation 1 below:

$$I_n = \frac{I_o + \sum_{i=0}^{3} w_r(i, a) I_r(i)}{1 + \sum_{i=0}^{3} w_r(i, a)} \quad \text{(Eq. 1)}$$

Io is the original pixel value in the current picture, $w_r(i,a)$ is a weight, $I_r(i)$ is a pixel value from the ith neighbor picture that corresponds to pixel value Io after motion compensation, and a is the number of neighbor pictures.

In one embodiment, $w_r(i,a)$ is calculated as follows:

$$w_r(i, a) = bw \cdot s_0 \cdot s_r(d, a) \cdot e^{-\frac{\Delta I(i)^2}{sw \cdot \sigma_I(QP)^2}}, \text{ where} \quad \text{(Eq. 2)}$$

bw is a weight value (this weight value is called the "base weight"),
$s_0$ is the overall filter strength,
$s_r$ is a function of the distance between the ith neighbor picture and the current picture (i.e., "d") and a, which is the total number of neighbor pictures, $\Delta I(i)^2$ is equal to $(I_0 - I_r(i))^2$, sw is a weight value (this weight value is called the "sigma weight"), and $\sigma_I(QP) = 3 \cdot (QP - 10)$, where QP is predefined quantization parameter.

In one embodiment d is either 1 or 2 and a is either 2 or 4. In such an embodiment: $s_r(1,2)=1.2$, $s_r(2,2)=1.0$, $s_r(1,4)=8.5$, and $s_r(2,4)=0.6$. In another embodiment, d can be 1, 2, 3, or 4 and a is either 4 or 8. In this embodiment:

$$s_r(d, 4) = \begin{cases} 1.13, & d = 1 \\ 0.97, & d = 2 \\ 0.81, & d = 3 \\ 0.57, & d = 4 \end{cases}$$

$$s_r(d, 8) = \begin{cases} 0.85, & d = 1 \\ 0.57, & d = 2 \\ 0.41, & d = 3 \\ 0.33, & d = 4 \end{cases}.$$

The overall filter strength, $s_0$, is set according to the equation below for RA:

| if (POC % 16 == 0) |
| $s_0 = 1.5$ |
| else if (POC % 8 == 0) |
| $s_0 = 0.95$ |

For the LD case, $s_0=0.40$ is used.

Each pixel value in the current picture starts with a default base weight (bwd) and a default sigma weight (swd). That is, bw is initialized to bwd and sw is initialized to swd. For example, in one embodiment, bwd=0.4 and swd is 2.0.

It is advantageous to modify bw and sw based on a block error and/or a block frequency metric. This makes the filter weight $w_r(i,a)$ more flexible and improves compression performance.

1. Block Error Metric

In one embodiment, an error metric (E) is calculated for each block of the current picture (e.g., each non overlapping 8×8 block) and neighbor picture. That is, each error metric is associated with a particular block of the current picture and a particular one of the neighbor pictures. Let SSD be the sum of squared differences between a block of the current picture and the corresponding block in the neighbor picture after motion compensation, and let V be the variance of the block. Then E for the block is computed as:

$$E = 0.2 \cdot \frac{SSD + 5}{V + 5} + \frac{SSD}{3200}$$

If E is less than 50, the base weight for pixel values from this block is multiplied by 1.2. That is, bw=1.2(bw). Accordingly, when bw is initialized as 0.4, then the new bw value is (1.2)(0.4)=0.48. If E is more than 100, the base weight is multiplied by 0.6 (i.e., bw=0.6(bw). If E is more than 50, the sigma weight is multiplied by 0.8 (i.e., sw=0.8(sw)).

In another embodiment, rather than calculating one error metric for each block of the current picture, an error metric can be calculated for each pixel value by, for example, forming a block (e.g., a 5×5 or 7×7 block) where the pixel is the center of the block.

2. Block Frequency Metric

In another embodiment, a frequency metric F for each block of the current picture and neighbor picture is computed. To do this, the pixel-wise difference between the current block of the current picture and the corresponding block in the neighbor picture after motion compensation is computed, to create a difference block D. If the pixel at position (x,y) in the current block has the value $B_{xy}$ and pixel (x,y) in the reference block has the value $R_{xy}$, then the pixels in D are computed as: $D_{xy}=B_{xy}-R_{xy}$.

The sum of squared differences between horizontally neighboring values in D, called HSD, is calculated, and the same for the vertically neighboring values, VSD.

That is, for an 8×8 block, $HSD=\Sigma_{x=0,y=0}^{x=6,y=7}(D_{xy}-D_{(x+1)y})^2$ and $VSD=\Sigma_{x=0,y=0}^{x=6,x=7}(D_{xy}-D_{x(y+1)})^2$ and $SSD=\Sigma_{x=0,y=0}^{x=7,y=7}(D_{xy})^2$.

F is then calculated according to:

$$F = \frac{300 \cdot SSD + 50}{10 \cdot HSD \cdot VSD + 50}$$

If F is larger or equal 25, the base weight is multiplied by 0.6, and sigma weight is multiplied by 0.8. That is, if F>25, then bw=0.6(bw) and sw=0.8(sw). This embodiment can be used in conjunction with the block error embodiment or as an alternative to the block error embodiment.

3. Neighbor Picture Weighing

The existing filter in VTM has a weight Sr that depends on the distance between the original frame and the neighbor picture. When neighbor pictures are only available in one direction, so is 1.2 and 1.0 for distance 1 and 2 respectively. When neighbor pictures are available in both directions, the weights are 0.85 and 0.6. In one embodiment, the filter can use up to four frames in either direction, when available. The new base weights are 1.13, 0.97, 0.81 and 0.57 for distances 1, 2, 3 and 4 when only one direction is available, and 0.85, 0.57, 0.41 and 0.33 otherwise. That is, in this embodiment Sr can be summarized as:

$$s_r(d, 4) = \begin{cases} 1.13, & d = 1 \\ 0.97, & d = 2 \\ 0.81, & d = 3 \\ 0.57, & d = 4 \end{cases}$$

$$s_r(d, 8) = \begin{cases} 0.85, & d = 1 \\ 0.57, & d = 2 \\ 0.41, & d = 3 \\ 0.33, & d = 4 \end{cases}$$

In addition, the base weight is modified based on the error metric (E) described above. The minimum E is computed for each temporally adjacent block to the current block. Then the base weights in each block are multiplied by:

$$\frac{\min(E) + 1}{E + 1}.$$

This embodiment can be used in conjunction with the block error and/or block frequency embodiment or as an alternative to these embodiments.

The above embodiments differ from the conventional filter by making measurements on an area including a particular pixel, in order to determine a filter weight for the particular pixel. In one embodiment, the particular pixel is a pixel of an 8×8 block. This allows for the weight modifications to be determined just once and then re-use them for all 64 pixels in the block. In an alternative embodiment, one might compute separate weight modifications for each pixel based on its surrounding N×N pixels (e.g. N=3, 5, 7, 9, etc.).

Figure 5:
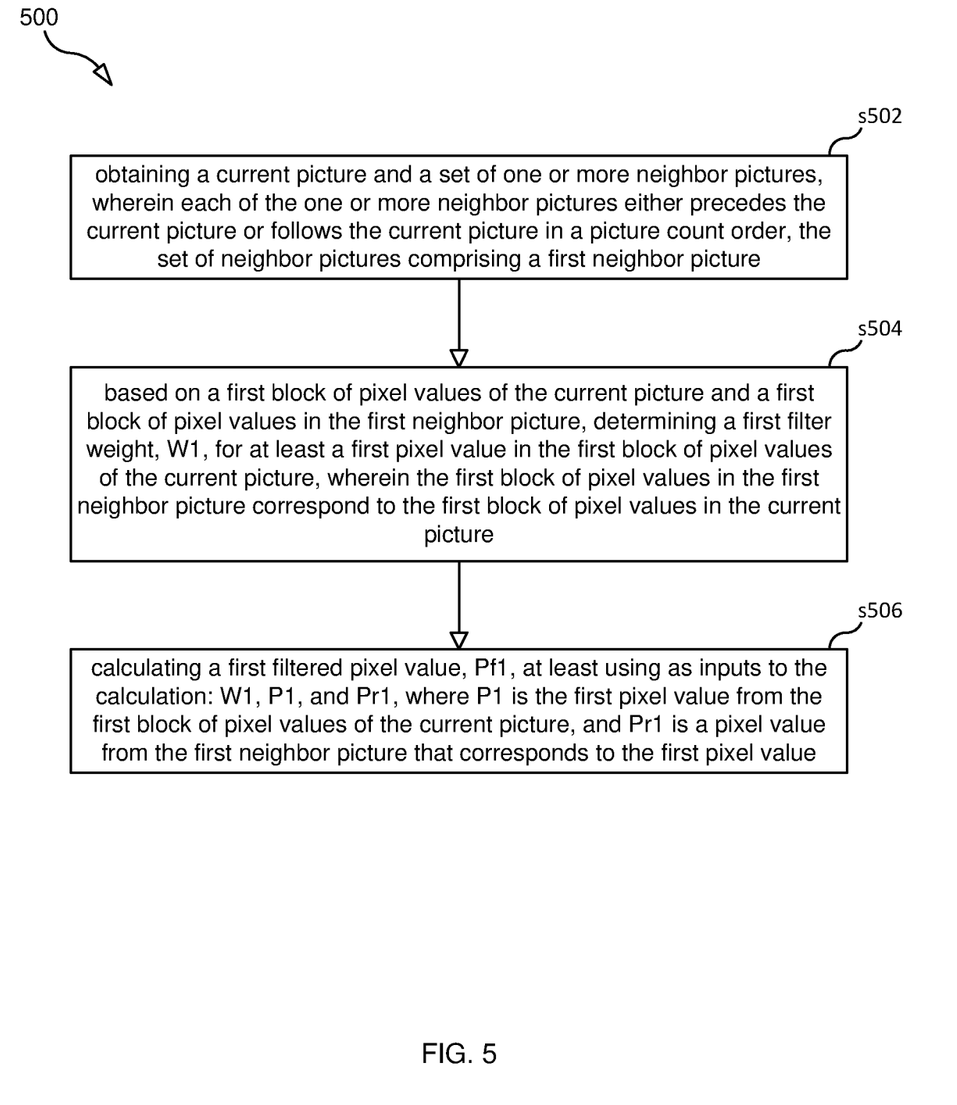
FIG. 5 is a flowchart illustrating a process according to an embodiment.

In one embodiment, temporal filter 101 performs a process 500 for producing filtered pixel values. Process 500 may begin with step s502.

Step s502 comprises obtaining a current picture and a set of one or more neighbor pictures, wherein each of the one or more neighbor pictures either precedes the current picture or follows the current picture in a picture count order, the set of neighbor pictures comprising a first neighbor picture.

Step s504 comprises, based on a first block of pixel values of the current picture and a first block of pixel values in the first neighbor picture, determining a first filter weight, W1, for at least a first pixel value in the first block of pixel values of the current picture, wherein the first block of pixel values in the first neighbor picture correspond to the first block of pixel values in the current picture.

Step s506 comprises calculating a first filtered pixel value (Pf1) at least using as inputs to the calculation: W1, P1, and Pr1, where P1 is the first pixel value from the first block of pixel values of the current picture, and Pr1 is a pixel value from the first neighbor picture that corresponds to the first pixel value.

In some embodiments, calculating Pf1 comprises calculating: P1+S, where S is a determined value, and process 500 further comprises determining S, wherein determining S comprises calculating W1×Pr1. In some embodiments, the set of neighbor pictures further comprises a second neighbor picture and the process further comprises: based on the first block of pixel values of the current picture and a first block of pixel values in the second neighbor picture, determining a second filter weight, W2, for at least the first pixel value in the first block of pixel values of the current picture, wherein the first block of pixel values in the second neighbor picture correspond to the first block of pixel values in the current picture, wherein determining S further comprises calculating W2×Pr2, where Pr2 is a pixel value from the second neighbor picture that corresponds to the first pixel value of the first block of the current picture. In some embodiments, determining S further comprises calculating: (W1×Pr1)+(W2×Pr2).

In some embodiments determining W1 comprises determining a base weight, bw, and a sigma weight, sw, where W1 is a function of at least: bw and sw. In some embodiments determining bw and sw comprises: 1) for each pixel value included in the first block of pixel values of the current picture, determining a squared difference by calculating: (Pi−Pri)^2, where Pi is the pixel value included in the first block of pixels of the current picture, and Pri is a pixel value from the neighbor picture that corresponds to Pi; 2) summing the determined squared differences to produce a sum of squared differences (SSD), value; 3) calculating at least one of an error value, E, or a frequency metric, F, where E is a function of the SSD value and F is a function of the SSD value; and 4) determining bw and sw based on E and/or F.

In some embodiments determining bw and sw comprises calculating E. In some embodiments determining bw based on E comprises: if E is less than a first threshold (e.g, 50), setting bw equal to a first base weight, bw1; else if E is greater than a second threshold (e.g, 100), setting bw equal to a second base weight, bw2, where bw2<bw1; else, setting bw equal to a default base weight (bwd) (e.g., bwd=0.4), where bw2<bwd<bw1. In some embodiments determining sw based on E comprises: if E is greater than the first threshold, setting sw equal to first sigma weight, sw1, otherwise setting sw equal to a default sigma weight.

In some embodiments determining bw and sw comprises calculating F. In some embodiments determining bw and sw based on F comprises: if F is less than a first threshold, setting bw equal to a default base weight, bwd, and setting sw equal to a default sigma weight (swd) (e.g., swd=2), otherwise setting bw=(c1)(bwd) and sw=(c2)(swd), where c1 and c2 are predetermined factors (e.g., c1=0.6 and c2=0.8).

In some embodiments, determining bw and sw comprises calculating E and F. In some embodiments determining bw based on E and F comprises: if F is less than a first threshold (e.g. 25) and E is between a second threshold (e.g., 50) and a third threshold (e.g., 100), setting bw equal a default base weight, bwd; else if F is less than the first threshold and E is less than the second threshold, setting bw equal to (c1)(bwd) (e.g. c1=1.2); else if F is less than the first threshold and E is greater than the third threshold, setting bw equal to (c2)(bwd) (e.g. c2=0.6); if F is not less than a first threshold (e.g. 25) and E is between the second threshold (e.g., 50) and the third threshold (e.g., 100), setting bw equal to (c3)(bwd) (e.g. c2=0.6); else if F is not less than the first threshold and E is less than the second threshold, setting bw equal to (c4)(bwd) (e.g. c4=0.72); else if F is not less than the first threshold and E is greater than the third threshold, setting bw equal to (c5)(bwd) (e.g. c5=0.36).

In some embodiments determining sw based on E and F comprises: if F is less than the first threshold (e.g. 25) and E is less than the second threshold (e.g., 50), setting sw equal to a default sigma weight (swd); else if F is less than the first threshold and E is greater than the second threshold, setting sw equal to (c6)(swd) (e.g. c6=0.8); else if F is not less than the first threshold and E is less than the second threshold, setting sw equal to (c7)(swd) (e.g. c7=0.8); else if F is not less than the first threshold and E is greater than the second threshold, setting sw equal to (c8)(swd) (e.g. c8=c6× c7=0.64).

In some embodiments process 500 also includes calculating a second filtered pixel value, Pf2, using as inputs to the calculation: W1, P2, and Pr2, where P2 is a second pixel value from the first block of pixel values of the current picture, and Pr2 is a pixel value from the first neighbor picture that corresponds to the second pixel value. In some embodiments determining W1 comprises calculating: (P1−Pr1)^2+(P2−Pr2)^2. In some embodiments process 500 also includes forming a filtered current picture, wherein forming the filtered current picture comprises: replacing P1 with Pf1; and replacing P2 with Pf2. In some embodiments process 500 further includes encoder 102 encoding the filtered current picture.

In some embodiments, determining W1 comprises calculating:

$$e^{-\frac{(P1-Pr1)^2}{c}},$$

where c is a function of a selected quantization parameter value and a first weight value (e.g., c=sw×(3×(QP−10))^2).

Figure 6:
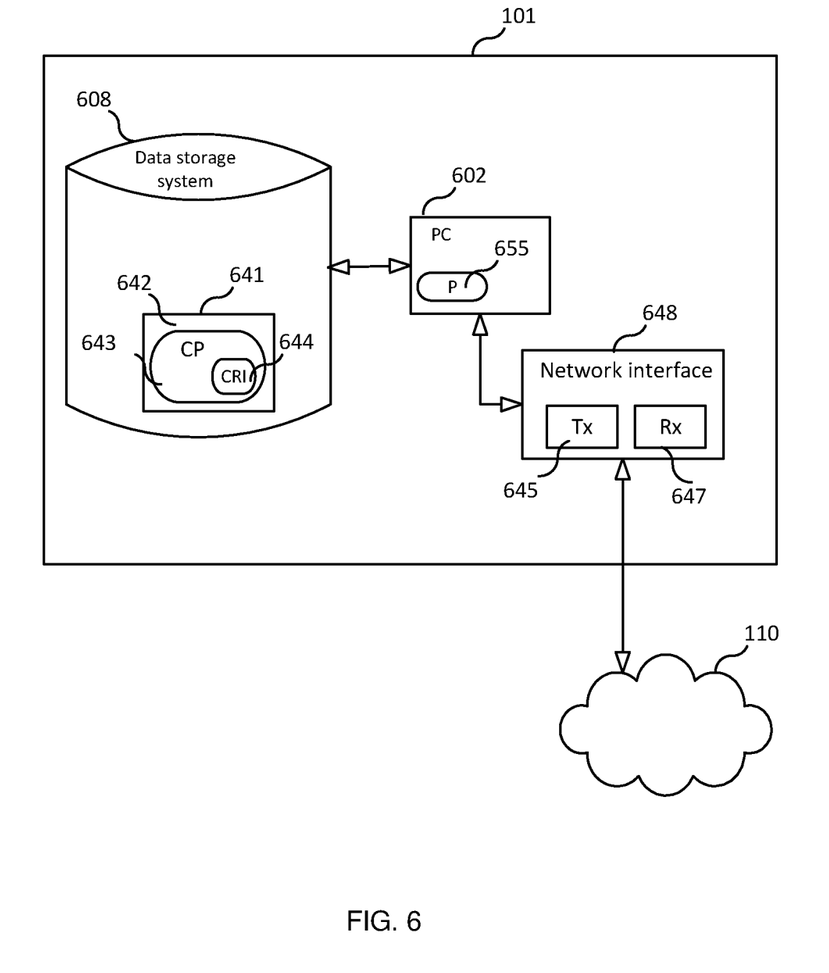
FIG. 6 is a block diagram of a temporal filter according to an embodiment.

FIG. 6 is a block diagram of temporal filter 101, according to some embodiments. As shown in FIG. 6, temporal filter 101 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed (i.e., temporal filter 101 may be a distributed computing apparatus); at least one network interface 648 (e.g., a physical interface or air interface) comprising a transmitter (Tx) 645 and a receiver (Rx) 647 for enabling temporal filter 101 to transmit data to and receive data from other nodes connected to a network 110 (e.g., an Internet Protocol (IP) network) to which network interface 648 is connected (physically or wirelessly) (e.g., network interface 648 may be coupled to an antenna arrangement comprising one or more antennas for enabling temporal filter 101 to wirelessly transmit/receive data); and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes temporal filter 101 to perform steps described herein (e.g., steps described herein with reference to the flow charts). In other embodiments, temporal filter 101 may be configured to perform steps described herein without the need for code. That is, for example, PC 602 may consist merely of one or more ASICs. Hence, the features of the embodiments described herein may be implemented in hardware and/or software.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

REFERENCES

[1] P. Wennersten, R. Sjöberg, J. Enhorn. "AHG10: Encoder-only GOP-based temporal filter", JVET-O0549, Gothenburg, SE, July 2019.

The invention claimed is:

1. A method for producing filtered pixel values, the method comprising:
obtaining a current picture and a set of one or more neighbor pictures, wherein each of the one or more neighbor pictures either precedes the current picture or follows the current picture in a picture count order, the set of neighbor pictures comprising a first neighbor picture;
based on a first block of pixel values of the current picture and a first block of pixel values in the first neighbor picture, determining a first filter weight, W1, for at least a first pixel value in the first block of pixel values of the current picture, wherein the first block of pixel values in the first neighbor picture correspond to the first block of pixel values in the current picture;
calculating a first filtered pixel value, Pf1, at least using as inputs to the calculation: W1, P1, and Pr1, where P1 is the first pixel value from the first block of pixel values of the current picture, and Pr1 is a pixel value from the first neighbor picture that corresponds to the first pixel value, wherein
determining W1 comprises determining a base weight, bw, and a sigma weight, sw, where W1 is a function of at least: bw and sw, and
determining bw and sw comprises:
for each pixel value included in the first block of pixel values of the current picture, determining a squared difference by calculating: (Pi−Pri)^2, where Pi is the pixel value included in the first block of pixels of the current picture, and Pri is a pixel value from the neighbor picture that corresponds to Pi;
summing the determined squared differences to produce a sum of squared differences, SSD, value;

calculating at least one of an error value, E, or a frequency metric, F, where E is a function of the SSD value and F is a function of the SSD value; and determining bw and sw based on E and/or F.

2. The method of claim 1, wherein
calculating Pf1 comprises calculating: P1+S, where S is a determined value, and
the method further comprises determining S, wherein determining S comprises calculating W1×Pr1.

3. The method of claim 2, wherein the set of neighbor pictures further comprises a second neighbor picture and the method further comprises:
based on the first block of pixel values of the current picture and a first block of pixel values in the second neighbor picture, determining a second filter weight, W2, for at least the first pixel value in the first block of pixel values of the current picture, wherein the first block of pixel values in the second neighbor picture correspond to the first block of pixel values in the current picture, wherein
determining S further comprises calculating W2×Pr2, where Pr2 is a pixel value from the second neighbor picture that corresponds to the first pixel value of the first block of the current picture.

4. The method of claim 3, wherein determining S further comprises calculating: (W1×Pr1)+(W2×Pr2).

5. The method of claim 1, wherein
determining bw and sw comprises calculating E,
determining bw based on E comprises:
if E is less than a first threshold, setting bw equal to a first base weight, bw1; else if E is greater than a second threshold, setting bw equal to a second base weight, bw2, where bw2<bw1; else, setting bw equal to a default base weight, bwd, where bw2<bwd<bw1, and
determining sw based on E comprises:
if E is greater than the first threshold, setting sw equal to first sigma weight, sw1, otherwise setting sw equal to a default sigma weight.

6. The method of claim 1, wherein determining bw and sw comprises calculating F, and determining bw and sw based on F comprises:
if F is less than a first threshold, setting bw equal to a default base weight, bwd, and setting sw equal to a default sigma weight, swd, otherwise setting bw=(c1)(bwd) and sw=(c2)(swd), where c1 and c2 are predetermined factors.

7. The method of claim 1, wherein
determining bw and sw comprises calculating E and F,
determining bw based on E and F comprises:
if F is less than a first threshold and E is between a second threshold and a third threshold, setting bw equal a default base weight, bwd; else if F is less than the first threshold and E is less than the second threshold, setting bw equal to (c1)(bwd); else if F is less than the first threshold and E is greater than the third threshold, setting bw equal to (c2)(bwd); if F is not less than a first threshold and E is between the second threshold and the third threshold, setting bw equal to (c3)(bwd); else if F is not less than the first threshold and E is less than the second threshold, setting bw equal to (c4)(bwd); else if F is not less than the first threshold and E is greater than the third threshold, setting bw equal to (c5)(bwd), and
determining sw based on E and F comprises:
if F is less than the first threshold and E is less than the second threshold, setting sw equal to a default sigma weight, swd; else if F is less than the first threshold and E is greater than the second threshold, setting sw equal to (c6)(swd); else if F is not less than the first threshold and E is less than the second threshold, setting sw equal to (c7)(swd); else if F is not less than the first threshold and E is greater than the second threshold, setting sw equal to (c8)(swd).

8. The method of claim 1, further comprising:
calculating a second filtered pixel value, Pf2, using as inputs to the calculation: W1, P2, and Pr2, where P2 is a second pixel value from the first block of pixel values of the current picture, and Pr2 is a pixel value from the first neighbor picture that corresponds to the second pixel value, wherein
determining W1 comprises calculating (P1−Pr1)^2+(P2−Pr2)^2.

9. The method of claim 8, further comprising forming a filtered current picture, wherein forming the filtered current picture comprises:
replacing P1 with Pf1; and
replacing P2 with Pf2.

10. The method of claim 9, further comprising encoding the filtered current picture.

11. The method of claim 1, wherein determining W1 comprises calculating:

$$e^{-\frac{(P1-Pr1)^2}{c}},$$

where c is a function of a selected quantization parameter value and a first weight value.

12. A non-transitory computer readable storage medium storing a computer program comprising instructions which when executed by processing circuitry of a temporal filter, causes the temporal filter to perform the method of claim 1.

13. A temporal filter, the temporal filter comprising:
processing circuitry; and
a memory, the memory containing instructions executable by the processing circuitry, wherein the temporal filter is operative to perform a method comprising:
obtaining a current picture and a set of one or more neighbor pictures, wherein each of the one or more neighbor pictures either precedes the current picture or follows the current picture in a picture count order, the set of neighbor pictures comprising a first neighbor picture;
based on a first block of pixel values of the current picture and a first block of pixel values in the first neighbor picture, determining a first filter weight, W1, for at least a first pixel value in the first block of pixel values of the current picture, wherein the first block of pixel values in the first neighbor picture correspond to the first block of pixel values in the current picture;
calculating a first filtered pixel value, Pf1, at least using as inputs to the calculation: W1, P1, and Pr1, where P1 is the first pixel value from the first block of pixel values of the current picture, and Pr1 is a pixel value from the first neighbor picture that corresponds to the first pixel value, wherein
determining W1 comprises determining a base weight, bw, and a sigma weight, sw, where W1 is a function of at least: bw and sw, and
determining bw and sw comprises:
for each pixel value included in the first block of pixel values of the current picture, determining a squared difference by calculating: (Pi−Pri)^2, where Pi is the pixel value included in the first block of pixels of the current picture, and Pri is a pixel value from the neighbor picture that corresponds to Pi;

summing the determined squared differences to produce a sum of squared differences, SSD, value;

calculating at least one of an error value, E, or a frequency metric, F, where E is a function of the SSD value and F is a function of the SSD value; and determining bw and sw based on E and/or F.

14. The temporal filter of claim 13, wherein calculating Pf1 comprises calculating: P1+S, where S is a determined value, and the method further comprises determining S, wherein determining S comprises calculating W1×Pr1.

15. The temporal filter of claim 14, wherein the set of neighbor pictures further comprises a second neighbor picture and the method further comprises:

based on the first block of pixel values of the current picture and a first block of pixel values in the second neighbor picture, determining a second filter weight, W2, for at least the first pixel value in the first block of pixel values of the current picture, wherein the first block of pixel values in the second neighbor picture correspond to the first block of pixel values in the current picture, wherein determining S further comprises calculating W2×Pr2, where Pr2 is a pixel value from the second neighbor picture that corresponds to the first pixel value of the first block of the current picture.

16. The temporal filter of claim 15, wherein determining S further comprises calculating: (W1×Pr1)+(W2×Pr2).

17. The temporal filter of claim 13, wherein determining bw and sw comprises calculating E, determining bw based on E comprises:

if E is less than a first threshold, setting bw equal to a first base weight, bw1; else if E is greater than a second threshold, setting bw equal to a second base weight, bw2, where bw2<bw1; else, setting bw equal to a default base weight, bwd, where bw2<bwd<bw1, and determining sw based on E comprises:

if E is greater than the first threshold, setting sw equal to first sigma weight, sw1, otherwise setting sw equal to a default sigma weight.

18. The temporal filter of claim 13, wherein determining bw and sw comprises calculating F, and determining bw and sw based on F comprises:

if F is less than a first threshold, setting bw equal to a default base weight, bwd, and setting sw equal to a default sigma weight, swd, otherwise setting bw=(c1)(bwd) and sw=(c2)(swd), where c1 and c2 are predetermined factors.

19. The temporal filter of claim 13, wherein determining bw and sw comprises calculating E and F, determining bw based on E and F comprises:

if F is less than a first threshold and E is between a second threshold and a third threshold, setting bw equal a default base weight, bwd; else if F is less than the first threshold and E is less than the second threshold, setting bw equal to (c1)(bwd); else if F is less than the first threshold and E is greater than the third threshold, setting bw equal to (c2)(bwd); if F is not less than a first threshold and E is between the second threshold and the third threshold, setting bw equal to (c3)(bwd); else if F is not less than the first threshold and E is less than the second threshold, setting bw equal to (c4)(bwd); else if F is not less than the first threshold and E is greater than the third threshold, setting bw equal to (c5)(bwd), and determining sw based on E and F comprises:

if F is less than the first threshold and E is less than the second threshold, setting sw equal to a default sigma weight, swd; else if F is less than the first threshold and E is greater than the second threshold, setting sw equal to (c6)(swd); else if F is not less than the first threshold and E is less than the second threshold, setting sw equal to (c7)(swd); else if F is not less than the first threshold and E is greater than the second threshold, setting sw equal to (c8)(swd).

20. The temporal filter of claim 13, wherein the method further comprises:

calculating a second filtered pixel value, Pf2, using as inputs to the calculation: W1, P2, and Pr2, where P2 is a second pixel value from the first block of pixel values of the current picture, and Pr2 is a pixel value from the first neighbor picture that corresponds to the second pixel value, wherein determining W1 comprises calculating $(P1-Pr1)^2+(P2-Pr2)^2$.

* * * * *